June 16, 1925.
C. E. GREGORY
JACK
Filed May 8, 1923
1,542,695
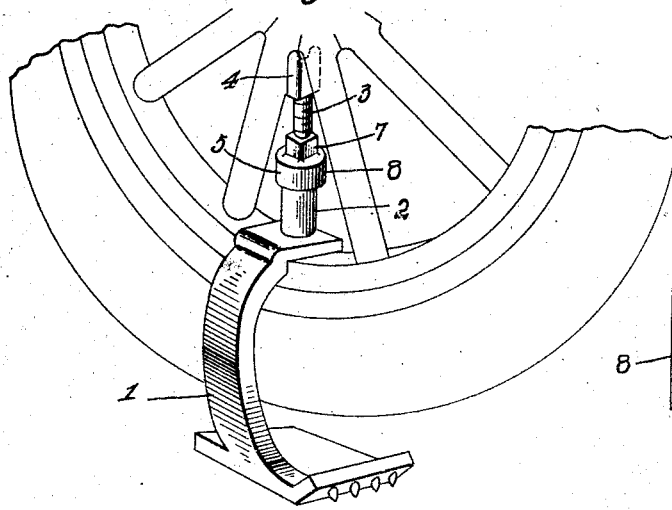
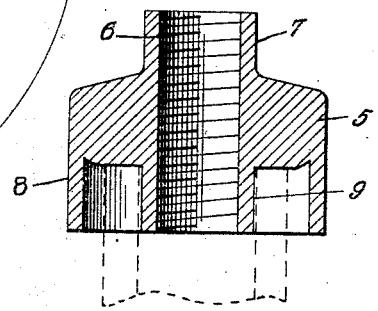
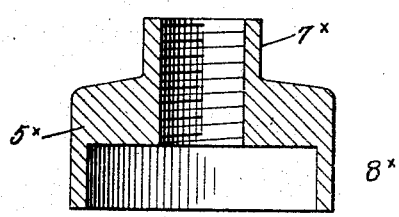
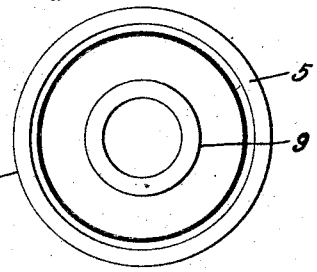
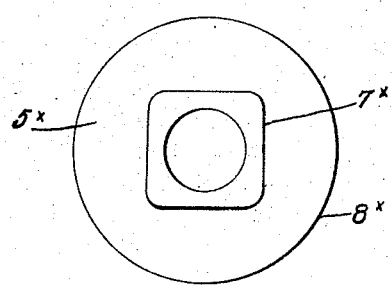
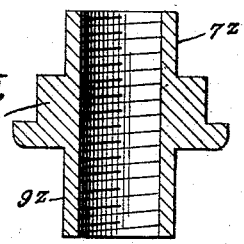
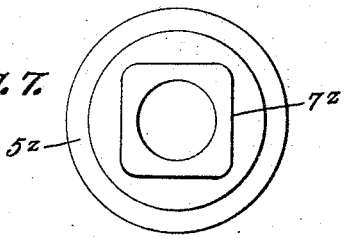
Charles E. Gregory
INVENTOR
BY Victor J. Evans
ATTORNEY
WITNESS Patented June 16, 1925.

1,542,695

UNITED STATES PATENT OFFICE.

CHARLES E. GREGORY, OF HAZELTON, NORTH DAKOTA.

JACK.

Application filed May 8, 1923. Serial No. 637,522.

*To all whom it may concern:*

Be it known that I, CHARLES E. GREGORY, a citizen of the United States, residing at Hazelton, in the county of Emmons and State of North Dakota, have invented new and useful Improvements in Jacks, of which the following is a specification.

The object of my said invention is to improve a wheel engaging and raising jack by the provision thereon of an efficient guide and adjusting nut.

To the attainment of the foregoing, the invention consists in the improvement as hereinafter described and definitely claimed.

In the accompanying drawings, forming part of this specification:—

Figure 1 is a view showing a wheel engaging and raising jack embodying a guide and adjusting nut of my invention.

Figure 2 is a diametrical section of said nut per se in full lines and the stand sleeve in dotted lines.

Figure 3 is an inverted plan view of said nut.

Figures 4 and 5 are views of modified guide and adjusting nuts.

Figure 6 is a plan view of the nut shown in Figure 4.

Figure 7 is a plan view of the nut shown in Figure 5.

Similar numerals of reference designate corresponding parts in Figures 1 to 3 to which reference will first be made.

The jack illustrated comprises a stand 1 on the upper portion of which is a vertically disposed sleeve 2, designed to receive a threaded shank 3 pendent from a head 4, designed to be interposed between wheel spokes and to bear against a wheel for the raising thereof.

In accordance with my invention, I provide a guide and adjusting nut 5 in combination with the stand 1 and the shank 3 on the head 4. The said nut 5 is interiorly threaded at 6 to engage the thread of the shank 3, and is provided with an upper portion 7 of angular form in cross section for the application of a wrench, and is also provided with an outer portion 8 of annular form and an inner portion 9 also of annular form, the outer portion 7 being adapted to snugly surround the upper end of the sleeve 2, and the inner portion 9 being adapted to bear snugly in the upper end of the sleeve 2. From this it follows that the nut 5 affords both an interior guide effect and an exterior guide effect with the result that the shank 3 is maintained in strict alinement with the longitudinal center of the sleeve 2. Manifestly it is within the purview of my invention to shape the nut portion 7 in any way that a wrench can be applied, whether it be a square head, hexagon, slotted or any shape that a wrench can be applied or power of any kind for the tightening of said nut. It is also within the purview of my invention to knurl the periphery of the nut 5 so that the hand will not slip while turning the nut up with the hand.

The nut $5^x$ shown in Figures 4 and 6 is provided with an upper portion $7^x$ of angular form in cross section and is also provided with an outer annular portion $8^x$ designed to snugly receive and turn about the upper end of the sleeve 2. From this it follows that said embodiment is possessed of an exterior guiding capacity only.

In the embodiment shown in Figures 5 and 7 the nut $5^z$ is provided with an upper portion $7^z$ of angular form in cross-section and is also provided with a pendent interiorly threaded portion $9^z$ of exterior circular cross-section and therefore adapted to bear and turn in the upper end of the sleeve 2 and to afford an interior guide effect calculated to maintain the threaded shank 3 in alinement with the vertical center of the sleeve 2.

It will be readily apparent from the foregoing that either one of my novel guide and adjusting nuts is simple and inexpensive, and yet is materially advantageous over an ordinary nut in the relation illustrated and described.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A wheel engaging and raising jack comprising a stand having at its upper end a vertically disposed sleeve, a head having a pendent threaded shank arranged and movable rectilinearly in said sleeve, and a guide and adjusting nut superposed on the upper end of the sleeve and interiorly threaded and receiving and engaging the threaded shank and having a portion for the engagement of means employed in turning the nut and also having a pendent portion laterally engaging and turnable with respect to the sleeve.

In testimony whereof I affix my signature.

CHARLES E. GREGORY.